US012567590B2

(12) United States Patent
Liu et al.

(10) Patent No.: US 12,567,590 B2
(45) Date of Patent: Mar. 3, 2026

(54) NEGATIVE ELECTRODE CURRENT COLLECTOR, NEGATIVE ELECTRODE PLATE AND ELECTROCHEMICAL DEVICE

(71) Applicant: Contemporary Amperex Technology Co., Limited, Ningde City (CN)

(72) Inventors: Xin Liu, Ningde City (CN); Qisen Huang, Ningde City (CN); Shiwen Wang, Ningde City (CN); Changliang Sheng, Ningde City (CN); Jia Peng, Ningde City (CN); Mingling Li, Ningde City (CN); Xianghui Liu, Ningde City (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 742 days.

(21) Appl. No.: 17/537,516

(22) Filed: Nov. 30, 2021

(65) Prior Publication Data

US 2022/0085380 A1      Mar. 17, 2022

Related U.S. Application Data

(63) Continuation of application No. PCT/CN2019/090403, filed on Jun. 6, 2019.

(30) Foreign Application Priority Data

May 31, 2019      (CN) .......................... 201910473184.6

(51) Int. Cl.
H01M 4/66          (2006.01)
H01M 4/02          (2006.01)

(52) U.S. Cl.
CPC ........... H01M 4/662 (2013.01); H01M 4/667 (2013.01); H01M 2004/027 (2013.01)

(58) Field of Classification Search
CPC . H01M 4/662; H01M 4/667; H01M 2004/027
See application file for complete search history.

(56) References Cited

U.S. PATENT DOCUMENTS

2004/0126663 A1      7/2004   Sudano et al.
2008/0220338 A1      9/2008   Iwama et al.
(Continued)

FOREIGN PATENT DOCUMENTS

CN            1177417 A        3/1998
CN      102290578 A    *  12/2011
(Continued)

OTHER PUBLICATIONS

JP-2018176565-A English machine translation (Year: 2024).*
(Continued)

*Primary Examiner* — Armindo Carvalho, Jr.
(74) *Attorney, Agent, or Firm* — East IP P.C.

(57)          ABSTRACT

The present application discloses a negative electrode current collector, a negative electrode plate and an electrochemical device. The negative electrode current collector includes an organic support layer and a copper-based conductive layer disposed on at least one surface of the organic support layer; and a copper-based crystal grain size in the copper-based conductive layer is from 10 nm to 500 nm. The negative electrode current collector provided by the present application has good mechanics properties while having less weight and good electrical conductivity and current collection performance, which can improve preparation yields of the negative electrode current collector, the negative electrode plate and the electrochemical device and their safety and reliability during use, and enables the electrochemical device to have relatively high gravimetric energy density and good electrochemical performance.

16 Claims, 2 Drawing Sheets

10

(56) References Cited

U.S. PATENT DOCUMENTS

| | | |
|---|---|---|
| 2018/0097251 A1 | 4/2018 | Li |
| 2018/0198132 A1 | 7/2018 | Liang et al. |

FOREIGN PATENT DOCUMENTS

| | | | | |
|---|---|---|---|---|
| CN | 103474632 A | 12/2013 | | |
| CN | 204088469 U | 1/2015 | | |
| CN | 107154499 A | 9/2017 | | |
| CN | 107221676 A | 9/2017 | | |
| CN | 107240721 A | 10/2017 | | |
| CN | 108232114 A | 6/2018 | | |
| CN | 108281662 A | 7/2018 | | |
| CN | 108598491 A | 9/2018 | | |
| CN | 109698359 A | 4/2019 | | |
| CN | 109786755 A | 5/2019 | | |
| CN | 107154499 B | * 5/2020 | ........ | H01M 10/0525 |
| JP | H09120818 A | 5/1997 | | |
| JP | 2003001756 A | 1/2003 | | |
| JP | 2018176565 A | * 11/2018 | | |
| KR | 1020180027953 A | 3/2018 | | |
| WO | 2012127561 A1 | 9/2012 | | |

OTHER PUBLICATIONS

CN-102290578-A English machine translation (Year: 2024).*
CN-107154499-B English machine translation (Year: 2024).*
The First Office Action for Japanese Application No. 2021-557695, dated Oct. 31, 2022, 16 pages.
The International search report for PCT Application No. PCT/CN2019/090403, dated Mar. 2, 2020, 10 pages.
The First Office Action for China Application No. 201910473184.6, dated Aug. 31, 2020, 14 pages.
The Second Office Action for China Application No. 201910473184. 6, dated Dec. 4, 2020, 6 pages.
Menglong Long et al. X-ray Diffraction Line Profile Analysis of Microstructure of Copper Thin Films. Physical Testing-Physics vol. 48, p. 508-511, dated Aug. 8, 2012.
The extended European search report for EP Application No. 19930526.9, dated Jul. 11, 2022, 8 pages.
The First Office Action for Indian Application No. 202117057418, dated Mar. 25, 2022, 6 pages.
The First Office Action for Korean Application No. 10-2021-7034236, dated Feb. 22, 2024, 18 pages.
The First Office Action for Chinese Application No. 202110552629. 7, dated Oct. 12, 2023, 10 pages.
The notice of allowance for Chinese Application No. 202110552629. 7, dated Aug. 22, 2024, 6 pages.

* cited by examiner

10

10

30

NEGATIVE ELECTRODE CURRENT COLLECTOR, NEGATIVE ELECTRODE PLATE AND ELECTROCHEMICAL DEVICE

CROSS-REFERENCE TO RELATED APPLICATION

This application is a continuation of International Application No. PCT/CN2019/090403, which claims priority to Chinese Patent Application No. 201910473184.6 filed on May 31, 2019, both of which are incorporated herein by reference in their entireties.

TECHNICAL FIELD

This application belongs to the technical field of electrochemical devices, and especially relates to a negative electrode current collector, a negative electrode plate, and an electrochemical device.

BACKGROUND

Electrochemical devices, such as lithium-ion secondary batteries have good charge and discharge performance and environmental friendliness, and have been widely used in electric vehicles and consumer electronic products. Current collectors are important parts of the electrochemical devices. They not only provide support for active material layers, but also collect current generated by the active material layers for external output. Therefore, the current collectors have an important influence on the performance of electrode plates and electrochemical devices.

On the basis, the present application proposes a negative electrode current collector with excellent performances, a negative electrode plate and an electrochemical device.

SUMMARY

The embodiments of the present application provides a negative electrode current collector, a negative electrode plate and an electrochemical device, aiming to obtain a negative electrode current collector having improved mechanical properties while having both low weight and good electrical conductivity and current collection performance.

In a first aspect, embodiments of present application provide a negative electrode current collector, including an organic support layer and a copper-based conductive layer disposed on at least one surface of the organic support layer, a copper-based crystal grain size in the copper-based conductive layer is from 10 nm to 500 nm.

In a second aspect, embodiments of the present application provide a negative electrode plate, including a negative electrode current collector and a negative electrode active material layer disposed on the current collector, wherein the negative electrode current collector is the negative electrode current collector according to the first aspect of the present application.

In a third aspect, embodiments of the present application provide an electrochemical device, including a positive electrode plate, a negative electrode plate and an electrolyte, wherein the negative electrode plate is the negative electrode plate according to the second aspect of the present application.

The embodiments of the present application provides a negative electrode current collector, a negative electrode plate and an electrochemical device. The negative electrode current collector includes an organic support layer and a copper-based conductive layer disposed on the organic support layer. The support layer adopting an organic material has a lighter weight, which is beneficial to making the negative electrode current collector and the negative electrode plate to have a smaller weight, so that the electrochemical device has a higher gravimetric energy density. Moreover, the support layer adopting the organic material has a relatively high toughness. At the same time, a copper-based crystal grain size in the copper-based conductive layer is from 10 nm to 500 nm, which enables the copper-based conductive layer and the organic support layer to have a high interface bonding force, and the copper-based conductive layer can be uniformly deformed with the extension of the organic support layer, which effectively prevents local stress concentration and greatly reduces the possibility of fracture of the copper-based conductive layer, thereby greatly improving the fracture toughness of the negative electrode current collector, improving the mechanical properties of the negative electrode current collector, and further significantly improving yields of the negative electrode current collector and the negative electrode plate and electrochemical device during preparation and their safety and reliability during use. Furthermore, a copper-based crystal grain size in the copper-based conductive layer is from 10 nm to 500 nm, which also ensure that the negative electrode current collector has good electrical conductivity and current collecting performance, so that the electrochemical device has relatively high electrochemical performance.

DESCRIPTION OF THE DRAWINGS

In order to explain the technical solutions of the embodiments of the present application more clearly, the following will briefly introduce the drawings that need to be used in the embodiments of the present application. A person of ordinary skill in the art can obtain other drawings based on the drawings without creative work.

Figure 1:
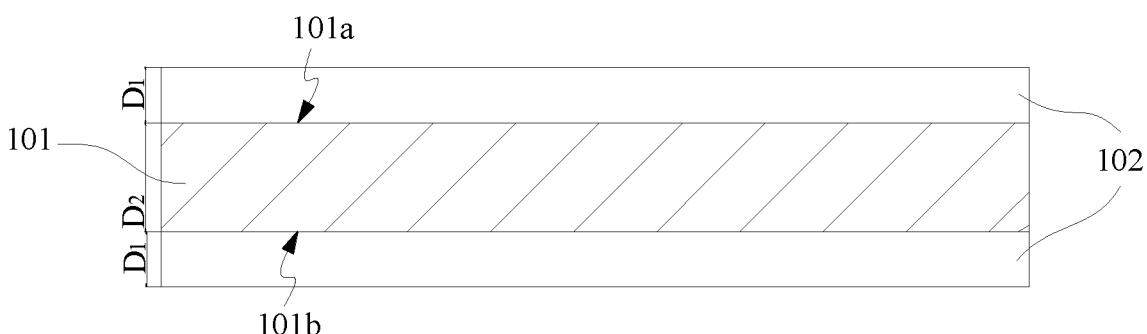
FIG. 1 is a schematic structural diagram of a negative electrode current collector according to an embodiment of the present application.

Denotation of the reference numerals: 10—Negative electrode current collector; 101—Organic support layer; 101*a*—First surface; 101*b*—Second surface; 1011—First sublayer; 1012—Second sublayer; 1013—Third sublayer; 102—Copper-based conductive layer; 103—Protective layer; 20—Negative electrode active material layer; 30—Negative electrode plate.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe all disclosed embodiments or implementations in this application. The following description illustrates exemplary embodiments more specifically. In many places throughout the application, guidance is provided through a series of examples, which can be used in various combinations. In each instance, the enumeration is only a representative group and should not be interpreted as exhaustive.

Negative Electrode Current Collector

In the first aspect, the embodiments of the present application provide a negative electrode current collector 10. FIG. 1 is a schematic structural diagram of a negative electrode current collector 10 as an embodiment of the present application. Referring to FIG. 1, the negative electrode current collector 10 includes an organic support layer 101 and a copper-based conductive layer 102 that are laminated.

The organic support layer 101 has a first surface 101a and a second surface 101b opposite in its thickness direction, and the copper-based conductive layer 102 is disposed on the first surface 101a and the second surface 101b of the organic support layer 101.

It is understandable that alternatively the copper-based conductive layer 102 may be disposed on either of the first surface 101a and the second surface 101b of the organic support layer 101. For example, the copper-based conductive layer 102 is disposed on the first surface 101a of the organic support layer 101. Apparently, the copper-based conductive layer 102 may also be disposed on the second surface 101b of the organic support layer 101.

In addition, a copper-based crystal grain size d in the copper-based conductive layer 102 is from 10 nm to 500 nm.

As used herein, the copper-based crystal grain size d in the copper-based conductive layer 102 can be tested according to the following test method: the negative electrode current collector 10 is subjected to an X-ray diffraction analysis to measure the diffraction peak of the copper-based conductive layer 102, for example, the diffraction peak of Cu (111) crystal plane, and then according to the diffraction angle and half-height width of the diffraction peak, the copper-based crystal grain size d is calculated using the Schemer formula as shown below:

$$d = K\gamma/(B\cos\theta)$$

in which, K is the Schemer constant, taking K=0.89; B is the half-height width of the diffraction peak, which is required to be converted to radians (rad) during calculation; $\theta$ is the diffraction angle; $\gamma$ is the X-ray wavelength, which is 0.154056 nm.

The negative electrode current collector 10 can be subjected to an X-ray diffraction analysis using instruments and methods known in the art. For example, an X-ray powder diffractometer is used to determine the X-ray diffraction spectrum in accordance with JIS K0131-1996 X-ray diffraction analysis general rules. As an example, the Bruker D8 Discover X-ray diffractometer from Bruker AxS, Germany, is used with CuK$\alpha$ rays as a radiation source, in which the ray wavelength $\lambda$=1.54056 Å, the scanning 2$\theta$ angle range is from 20° to 80°, and the scanning rate is 0.05°/s.

The negative electrode current collector 10 of the embodiment of the present application includes an organic support layer 101 and a copper-based conductive layer 102 disposed on the organic support layer 101.

Since density of the organic support layer 101 is lower than that of metal (for example, copper), compared with the traditional copper foil current collector, the negative electrode current collector according to the present application can help to reduce the weight of the electrochemical device, thereby significantly improving the energy density of the electrochemical device.

In addition, the support layer using organic materials has higher toughness, and the copper-based crystal grain size d in the copper-based conductive layer 102 is from 10 nm to 500 nm, so that the copper-based conductive layer 102 and the organic support layer 101 have a higher interface bonding force, and the copper-based conductive layer 102 can be uniformly deformed with the extension of the organic support layer 101, effectively prevent local stress concentration, and greatly reduce the probability of the fracture of copper-based conductive layer 102, thereby greatly improving the fracture toughness of the negative electrode current collector 10, improving the mechanical properties of the negative electrode current collector 10, and preventing the negative electrode current collector 10 from breaking or forming microcracks during processing or use, and further significantly improving yields of the negative electrode current collector 10, the negative electrode plate 20 and electrochemical device during preparation and their safety and reliability during use.

The copper-based crystal grain size d in the copper-based conductive layer 102 is from 10 nm to 500 nm, which ensures that the copper-based conductive layer 102 has good electrical conductivity, thereby ensuring that the negative electrode current collector 10 has good electrical conductivity and current collecting performance, and at the same time which is beneficial to making the negative electrode plate 20 and the electrochemical device to have low impedance and reduces the polarization of the negative electrode, so that the electrochemical device has higher electrochemical performance, such as the electrochemical device has higher rate performance and cycle performance.

In some optional embodiments, the upper limit of the copper-based crystal grain size d in the copper-based conductive layer 102 can be selected from 500 nm, 450 nm, 400 nm, 350 nm, 300 nm, 250 nm, 200 nm, 150 nm, 100 nm, 80 nm, 50 nm and the lower limit can be selected from 380 nm, 320 nm, 280 nm, 240 nm, 180 nm, 120 nm, 90 nm, 70 nm, 30 nm, 10 nm. The range of the copper-based crystal grain size d in the copper-based conductive layer 102 can be formed by a combination of any lower limit and any upper limit, or a combination of any lower limit and any other lower limit, or a combination of any upper limit and any other upper limit.

Preferably, the copper-based crystal grain size d in the copper-based conductive layer 102 is from 30 nm to 300 nm, more preferably from 50 nm to 150 nm. The copper-based conductive layer 102 having the above mentioned copper-based crystal grain size d, which can enable the negative electrode current collector 10 to better exert the above-mentioned effects.

In the negative electrode current collector 10 of the embodiments of the present application, the thickness $D_1$ of the copper-based conductive layer 102 is preferably 30 nm$\leq D_1 \leq$3 µm.

In the negative electrode current collector 10 of the embodiments of the present application, the copper-based conductive layer 102 with a smaller thickness is disposed on the surface of the organic support layer 101, which can significantly reduce the weight of the negative electrode current collector 10 compared with the traditional metal current collector (such as a copper foil), thereby reducing the weight of the electrochemical device and significantly increasing the energy density of the electrochemical device.

In addition, the thickness $D_1$ of the copper-based conductive layer 102 is preferably 30 nm$\leq D1 \leq$3 µm, which enables the copper-based conductive layer 102 to have good electrical conductivity, and is beneficial to ensuring that the negative electrode current collector 10 has good electrical conductivity and current collecting performance, thereby ensuring that the electrochemical device has good electrochemical performance; and which enables the copper-based conductive layer 102 not to be easy to break during processing and use, so that the negative electrode current collector 10 has higher fracture toughness, and ensures that the negative electrode current collector 10 has better mechanical stability and work stability. In addition, with the thickness $D_1$ of the copper-based conductive layer 102 being within the above-mentioned range, in the case of abnormalities such as nail penetration in the electrochemical device, the copper-based conductive layer 102 generates relatively small burrs, which can reduce the risk of exposure of the metal burrs to the counter electrode, thereby improving the safety performance of electrochemical devices.

In some optional embodiments, the upper limit of the thickness $D_1$ of the copper-based conductive layer 102 can be selected from 3 µm, 2.5 µm, 2 µm, 1.8 µm, 1.5 µm, 1.2 µm, 1 µm, 900 nm, 750 nm, 450 nm, 250 nm, 100 nm, and the lower limit can be selected from 1.6 µm, 1 µm, 800 nm, 600 nm, 400 nm, 300 nm, 150 nm, 100 nm, 80 nm, 30 nm. The range of the thickness $D_1$ of the copper-based conductive layer 102 can be formed by a combination of any of the aforementioned lower limits and any upper limits, or by a combination of any lower limit and any other lower limit, or by a combination of any upper limit and any other upper limit.

More preferably, the thickness $D_1$ of the copper-based conductive layer 102 is 300 nm$\leq D1 \leq$2 µm, preferably 500 nm$\leq D_1 \leq$1.5 µm, and further is 600 nm$\leq D_1 \leq$1.2 µm.

In some embodiments, the thickness $D_1$ of the copper-based conductive layer 102 and the copper-based crystal grain size d satisfies 1$\leq D_1/d \leq$300. The thickness $D_1$ of the copper-based conductive layer 102 and the copper-based crystal grain size d satisfying the above relationship can enable the negative electrode current collector 10 to have better mechanical properties, as well as to have higher electrical conductivity and current collection performance.

In some optional embodiments, the upper limit of $D_1/d$ may be selected from 300, 280, 250, 230, 220, 200, 190, 170, 150, 120, 100, 80, 60, 50, 48, and the lower limit can be selected from 1, 2, 3, 5, 6, 8, 10, 12, 15, 18, 20, 22, 25, 30, 33, 35, 37, 40, 42, 45. The range of D1/d can be formed by a combination of any lower limit and any upper limit, or a combination of any lower limit and any other lower limit, and it can also be formed by a combination of any upper limit and any other upper limit.

Preferably, the thickness $D_1$ of the copper-based conductive layer 102 and the copper-based crystal grain size d satisfy 2$\leq D_1/d \leq$100, more preferably 3$\leq D_1/d \leq$50.

In the negative electrode current collector 10 of the embodiments of the present application, the copper-based conductive layer 102 includes one or more of copper (Cu) and copper alloy.

Copper alloy is an alloy in which copper is the main element and one or more additional elements are included. Preferably, the additional element is selected from titanium (Ti), vanadium (V), nickel (Ni), chromium (Cr), iron (Fe), cobalt (Co), manganese (Mn), zinc (Zn), zirconium (Zr), molybdenum (Mo), niobium (Nb), tungsten (W), silver (Ag), palladium (Pd) and cadmium (Cd).

The introduction of one or more of the above-mentioned additional elements can improve the mechanical properties, tolerance to processing and corrosion resistance of the copper alloy conductive layer.

Further preferably, the mass percentage of the copper element in the copper alloy is 80 wt % or above, more preferably 90 wt % or above, for example, from 90 wt % to 95 wt %. The mass percentage of the copper element in the copper alloy is within the above-mentioned range, which enables the copper alloy conductive layer to have higher electrical conductivity, mechanical properties, tolerance to processing and corrosion resistance.

In the negative electrode current collector 10 of the embodiments of the present application, the organic support layer 101 has a Young's modulus E preferably ≥2 Gpa, which enables the organic support layer 101 to have good toughness and also suitable rigidity, so that it can better support the copper-based conductive layer 102 to ensure the overall strength of the negative electrode current collector 10, but also it will not be excessively extended or deformed during the processing of the negative electrode current collector 10, which more effectively prevents the organic support layer 101 and the copper-based conductive layer 102 from breaking, and enables higher bonding strength between the organic support layer 101 and the copper-based conductive layer 102 without delamination of the copper-based conductive layer 102. Thus, the mechanical stability and working stability of the negative electrode current collector 10 are improved, thereby improving the performance of the electrochemical device.

Further, the Young's modulus E of the organic support layer 101 is preferably 2 GPa$\leq$E$\leq$20 GPa, such as 2 GPa, 3 GPa, 4 GPa, 5 GPa, 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa, or 20 GPa. This enables the organic support layer 101 to have appropriate toughness and appropriate rigidity, and winding flexibility during processing.

The Young's modulus E of the organic support layer 101 can be measured by methods known in the art. As an example, the organic support layer 101 is cut into a 15 mm×200 mm sample, thickness h (µm) of the sample is measured with a ten-thousandth micrometer, a tensile test is performed with Go-tech tension tester at normal temperature and pressure (25° C., 0.1 MPa), an initial position is set such that the sample between the clamps is 50 mm long, the sample is stretched at a speed of 50 mm/min, the load L (N) from stretching to break and clamp displacement y (mm) are recorded, then stress ε (GPa)=L/(15×h), strain η=y/50, a stress-strain curve is drawn, and the curve of an initial linear region is selected, wherein the slope of this curve is the Young's modulus E.

In the negative electrode current collector 10 of the embodiments of the present application, the thickness $D_2$ of the organic support layer 101 is preferably 1 μm≤$D_2$≤30 μm. The thickness $D_2$ of the organic support layer 101 is 1 μm or above, which enables the organic support layer 101 to have relatively high mechanical strength, not to be easy to break during processing and use, and to support and protect the copper-based conductive layer 102 well, thereby improving the mechanical stability and working stability of the negative electrode current collector 10. The thickness $D_2$ of the organic support layer 101 is 30 μm or less, which enables the electrochemical device to have relatively small size and relatively low weight, thereby increasing volumetric energy density and gravimetric energy density of the electrochemical device.

In some optional embodiments, the upper limit of the thickness $D_2$ of the organic support layer 101 may be 30 μm, 25 μm, 20 μm, 18 μm, 15 μm, 12 μm, 10 μm or 8 μm, and the lower limit may be 1 μm, 1.5 μm, 2 μm, 3 μm, 4 μm, 5 μm, 6 μm, 7 μm, 9 μm or 16 μm. The range of the thickness $D_2$ of the organic support layer 101 can be formed by a combination of any of the foregoing upper limit and any lower limit, or can be formed by a combination of the foregoing any upper limit and any other upper limit, or can be formed by a combination of the foregoing any lower limit and any other lower limit value.

Further preferably, the thickness $D_2$ of the organic support layer 101 is 1 μm≤$D_2$≤15 μm, preferably 1 μm≤$D_2$≤10 μm, preferably 1 μm≤$D_2$≤8 μm, preferably 2 μm≤$D_2$≤8 μm, more preferably 2 μm≤$D_2$≤6 μm. When the thickness $D_2$ of the organic support layer 101 is 1 μm≤D2≤15 μm, preferably no more than 10 μm, especially no more than 8 μm, the gravimetric energy density and volumetric energy density of the electrochemical device can be made higher, and the d value of the copper-based conductive layer 102 and the D1/d value within the above range will be able to better improve the mechanical properties of the negative electrode current collector 10, and enable the negative electrode current collector 10 to have both higher electrical conductivity and current collecting performance. Also, the d value of the copper-based conductive layer 102 and the D1/d value have more obvious effects on the mechanics properties and mechanical properties of the negative electrode current collector 10.

In the negative electrode current collector 10 of the embodiments of the present application, the organic support layer 101 adopts one or more of polymer materials and polymer-based negative electrode materials.

For example, the polymer materials are one or more of polyamides, polyimides, polyesters, polyolefins, polyynes, siloxane polymers, polyethers, polyols, polysulfones, polysaccharide polymers, amino acid polymers, polysulfur nitrides, aromatic ring polymers, aromatic heterocyclic polymers, epoxy resin, phenolic resin, derivatives thereof, cross linkers thereof, and copolymers thereof.

Furthermore, for example, the polymer materials are one or more of polycaprolactam (commonly known as nylon 6), polyhexamethylene adipamide (commonly known as nylon 66), polyparaphenylene terephthalamide (PPTA), polyisophthaloyl metaphenylene diamine (PMIA), polyethylene terephthalate (PET), polybutylene terephthalate (PBT), polyethylene naphthalate (PEN), polycarbonate (PC), polyethylene (PE), polypropylene (PP), polypropylene (PPE), polyvinyl alcohol (PVA), polystyrene (PS), polyvinyl chloride (PVC), polyvinylidene fluoride (PVDF), polytetrafluoroethylene (PTEE), poly(sodium styrene sulfonate) (PSS), polyacetylene (PA), silicone rubber, polyoxymethylene (POM), polyphenylene ether (PPO), polyphenylene sulfide (PPS), polyethylene glycol (PEG), cellulose, starch, protein, polyphenylene, polypyrrole (PPy), polyaniline (PAN), polythiophene (PT), polypyridine (PPY), acrylonitrile-butadiene-styrene copolymer (ABS), derivatives thereof, cross linkers thereof, and copolymers thereof.

As the above-mentioned polymer-based composite materials, they may include the above-mentioned polymer materials and additives. The additives may include one or more of metallic materials and inorganic non-metallic materials.

As metal material additives, for example one or more of aluminum, aluminum alloy, copper, copper alloy, nickel, nickel alloy, titanium, titanium alloy, iron, iron alloy, silver, and silver alloy can be given.

As inorganic non-metallic material additives, for example, one or more of carbon-based materials, alumina, silicon dioxide, silicon nitride, silicon carbide, boron nitride, silicate, and titanium oxide, and also for example, one or more of glass materials, ceramics materials and ceramic composite materials can be given. The carbon-based material additives are, for example, one or more of graphite, superconducting carbon, acetylene black, carbon black, Ketjen black, carbon dots, carbon nanotubes, graphene, and carbon nanofibers.

As the above-mentioned additives, they may be metal-coated carbon-based materials, such as one or more of nickel-coated graphite powder and nickel-coated carbon fibers.

Preferably, the organic support layer 101 adopts one or more of insulating polymer materials and insulating polymer-based composite materials. The organic support layer 101 has a relatively high volume resistivity, which is beneficial to improving the safety performance of the electrochemical device.

Further, the organic support layer 101 includes one or more of polyethylene terephthalate (PET), polybutylene terephthalate (PBT), polyethylene naphthalate (PEN), poly (sodium styrene sulfonate) (PSS) and polyimide (PI).

In the negative electrode current collector 10 of the embodiments of the present application, the organic support layer 101 may be of a single-layer structure, or a composite layer structure of two or more layers, such as two layers, three layers, or four layers.

Figure 2:
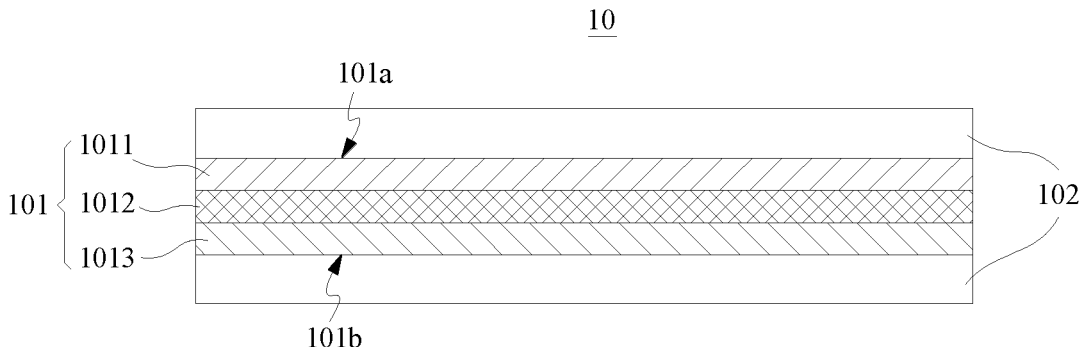
FIG. 2 is a schematic structural diagram of a negative electrode current collector according to another embodiment of the present application.

FIG. 2 is a schematic structural diagram of another negative electrode current collector 10 according to an embodiment of the present application. Referring to FIG. 2, the organic support layer 101 is of a composite layer structure formed by laminating a first sublayer 1011, a second sublayer 1012, and a third sublayer 1013. The organic support layer 101 of the composite layer structure has a first surface 101a and a second surface 101b opposite to each other, and the copper-based conductive layers 102 are laminated on the first surface 101a and the second surface 101b of the organic support layer 101. Apparently, the copper-based conductive layer 102 may be disposed only on the first surface 101a of the organic support layer 101, or only on the second surface 101b of the organic support layer 101.

When the organic support layer 101 is of a composite layer structure of two or more layers, materials of the sublayers may be the same or different.

Figure 3:
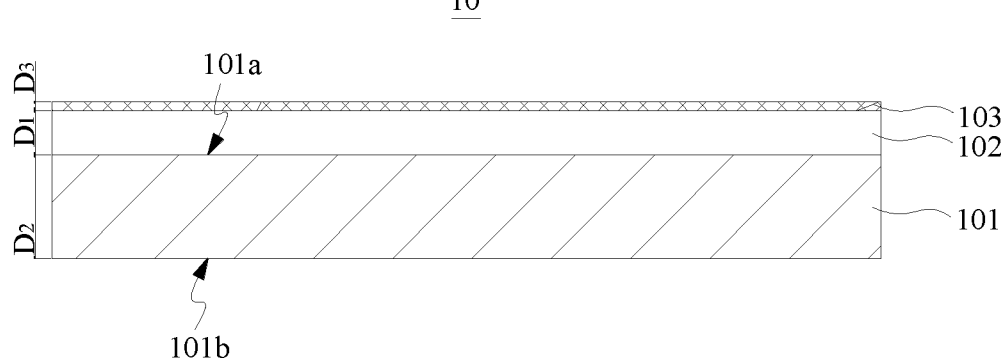
FIG. 3 is a schematic structural diagram of a negative electrode current collector according to another embodiment of the present application.
Figure 4:
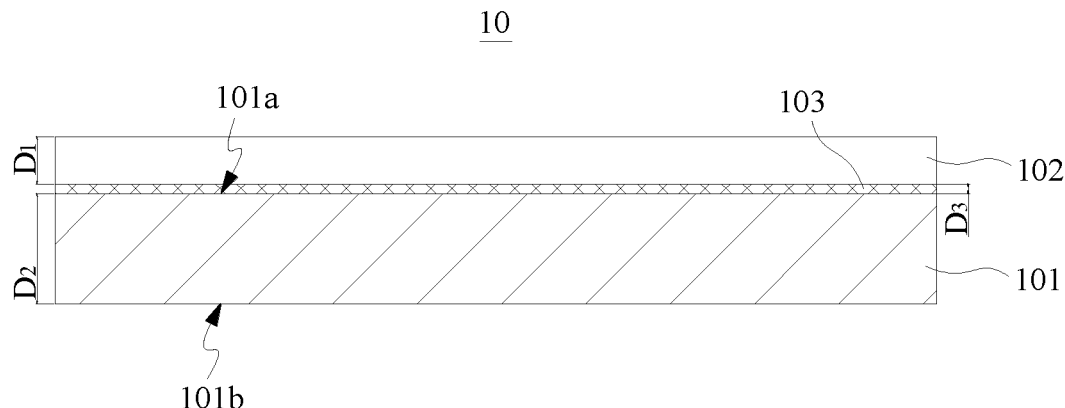
FIG. 4 is a schematic structural diagram of a negative electrode current collector according to another embodiment of the present application.
Figure 5:
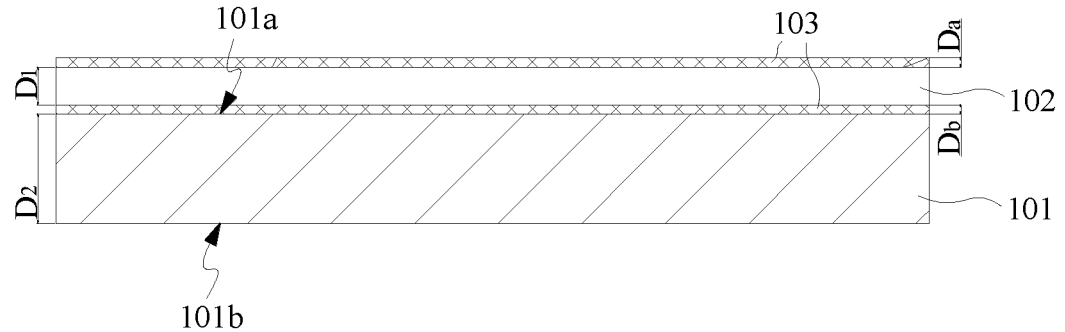
FIG. 5 is a schematic structural diagram of a negative electrode current collector according to another embodiment of the present application.

The negative electrode current collector 10 according to the embodiments of the present application further optionally includes a protective layer 103. Referring to FIGS. 3 to 5, the copper-based conductive layer has two opposite surfaces in its thickness direction, and the protective layer 103 is disposed on either or both of two opposite surfaces of either copper-based conductive layer 102 to protect the copper-based conductive layer 102, prevent the copper-based conductive layer 102 from chemical corrosion or mechanical damage, and ensure the working stability and service life of the negative electrode current collector 10, which is beneficial to enabling the electrochemical device to have relatively high safety performance and electrochemical performance. In addition, the protective layer 103 can also increase the strength of the negative electrode current collector 10.

It is understandable that although FIGS. 3 to 5 show the copper-based conductive layer 102 on a single side of the organic support layer 101, and the protective layer(s) 103 on either or both of two opposite surfaces of the copper-based conductive layer 102 in its thickness direction, in other embodiments, the copper-based conductive layers 102 may be respectively disposed on two opposite surfaces of the organic support layer 101, and the protective layer(s) 103 may be disposed on either or both of two opposite surfaces of each copper-based conductive layer 102 in its thickness direction, or the protective layer 103 maybe disposed on either or both of two opposite surfaces of two copper-based conductive layers 102 in their thickness direction.

The protective layer 103 includes one or more of metal, metal oxide, and conductive carbon.

For example, the above-mentioned metal may include one or more of nickel, chromium, nickel-based alloy, and copper-based alloy. The above-mentioned nickel-based alloy is an alloy formed by adding one or more other elements to pure nickel as a matrix, and is preferably a nickel-chromium alloy. The nickel-chromium alloy is an alloy formed of metallic nickel and metallic chromium. Optionally, a weight ratio of nickel to chromium in the nickel-chromium alloy is from 1:99 to 99:1, such as 9:1. The above-mentioned copper-based alloy is an alloy formed by adding one or more other elements to pure copper as a matrix, and is preferably a nickel-copper alloy. Optionally, a weight ratio of nickel to copper in the nickel-copper alloy is from 1:99 to 99:1, such as 9:1.

The above-mentioned metal oxide is, for example, one or more of aluminum oxide, cobalt oxide, chromium oxide, and nickel oxide.

The above-mentioned conductive carbon is, for example, one or more of graphite, superconducting carbon, acetylene black, carbon black, Ketjen black, carbon dots, carbon nanotubes, graphene and carbon nanofibers, and further include one or more of carbon black, carbon nanotubes, acetylene black, and graphene.

Further, the protective layer 103 preferably adopts one or more of metals and metal oxides, which can improve the performance of the negative electrode current collector 10.

Figure 6:
FIG. 6 is a schematic structural diagram of a negative electrode plate according to an embodiment of the present application.

The metal protective layer and the metal oxide protective layer have high corrosion resistance, high hardness and large specific surface area, which can effectively prevent the copper-based conductive layer 102 from chemical corrosion or mechanical damage, and enhance the strength of the negative electrode current collector 10 and improve the stability and service life of the negative electrode current collector 10; at the same time, which can further improve the interface between the copper-based conductive layer 102 and the organic support layer 101 or the negative electrode active material layer 20 (as shown in FIG. 6), and improve the performance of the electrochemical device.

As some examples, referring to FIG. 3, the negative electrode current collector 10 includes an organic support layer 101, an copper-based conductive layer 102 and a protective layer 103 that are laminated. The organic support layer 101 has a first surface 101*a* and a second surface 101*b* opposite in its thickness direction, the copper-based conductive layer 102 is disposed on at least one of the first surface 101*a* and the second surface 101*b* of the organic support layer 101, and the protective layer 103 is disposed on the surface of the copper-based conductive layer 102 facing away from the organic support layer 101.

The protective layer 103 disposed on the surface of the copper-based conductive layer 102 facing away from the organic support layer 101 (referred to as an upper protective layer for short) protects the copper-based conductive layer 102 from chemical corrosion and mechanical damage, also improves the interface between the negative electrode current collector 10 and the active material layer 20 and improves the bonding force between the negative electrode current collector 10 and the active material layer 20. The above effects can be further improved if the upper protective layer is a metal protective layer or metal oxide protective layer.

Further, when the upper protective layer is a metal protective layer, the interface resistance can also be significantly reduced, the conductivity performance between the negative electrode current collector 10 and the negative electrode active material layer 201 can be improved, the negative electrode polarization can be reduced, and the performance of the electrochemical device can be improved.

Or further, when the upper protective layer is a metal oxide protective layer, it can more apparently protect against chemical corrosion and mechanical damage.

Further, the upper protective layer can be a double-layer protective layer of a metal protective layer and a metal oxide protective layer, preferably comprises a metal protective layer that is provided on the surface of the copper-based conductive layer 102 facing away from the organic support layer 101, and a metal oxide protective layer that is further provided on the surface of the metal protective layer facing away from the organic support layer 101, so as to better improve the conductivity, corrosion resistance, and mechanical damage resistance of the negative electrode current collector 10.

As some other examples, referring to FIG. 4, the negative electrode current collector 10 includes an organic support layer 101, an copper-based conductive layer 102 and a protective layer 103 that are laminated. The organic support layer 101 has a first surface 101*a* and a second surface 101*b* opposite in its thickness direction, the copper-based conductive layer 102 is laminated on at least one of the first surface 101*a* and the second surface 101*b* of the organic support layer 101, and the protective layer 103 is laminated on the surface of the copper-based conductive layer 102 facing toward the organic support layer 101.

On the surface of the copper-based conductive layer 102 facing toward the organic support layer 101 is disposed the protective layer 103(referred to as a lower protective layer for short), and the lower protective layer protects the copper-based conductive layer 102 from chemical corrosion and mechanical damage. Meanwhile, the lower protective layer can also improve the bonding force between the copper-based conductive layer 102 and the organic support layer 101, prevent the copper-based conductive layer 102 from separating from the organic support layer 101, and improve the supporting and protecting effect on the copper-based conductive layer 102.

Further, the lower protective layer is a metal oxide protective layer. The metal oxide protective layer has relatively larger specific surface area and higher hardness, which is conducive to further improving the bonding force between the copper-based conductive layer 102 and the organic support layer 101, and to increasing the strength of the negative electrode current collector 10.

Alternatively further, when the lower protective layer is a metal protective layer, it can improve the bonding force between the copper-based conductive layer 102 and the organic support layer 101 and increase the strength of the negative electrode current collector 10, while better reducing the polarization of the electrode plate and enhancing the conductivity of the negative electrode current collector 10. The lower protective layer is preferably a metal protective layer.

As still other examples, referring to FIG. 5, the negative electrode current collector 10 includes an organic support layer 101, a copper-based conductive layer 102 and a protective layer 103 that are laminated. The organic support layer 101 has a first surface 101$a$ and a second surface 101$b$ opposite in its thickness direction, the copper-based conductive layer 102 is laminated on at least one of the first surface 101$a$ and the second surface 101$b$ of the organic support layer 101, and the protective layer 103 is disposed on the surface of the copper-based conductive layer 102 facing away the organic support layer 101 and on the surface of the copper-based conductive layer 102 facing toward the organic support layer 101.

The protective layer 103 is disposed on both surfaces of the copper-based conductive layer 102 to more fully protect the copper-based conductive layer 102, so that the negative electrode current collector 10 has relatively high comprehensive performance.

It is understandable that the protective layers 103 on the two surfaces of the copper-based conductive layer 102 may be made of the same or different materials, and may have the same or different thicknesses.

Preferably, the thickness $D_3$ of the protective layer 103 is 1 nm≤$D_3$≤200 nm, and $D_3$≤0.1 $D_1$. If the protective layer 103 is too thin, it will not be sufficient to protect the copper-based conductive layer 102; if it is too thick, the energy density of the electrochemical device will be reduced.

In some embodiments, the upper limit of the thickness $D_3$ of the protective layer 103 may be 200 nm, 180 nm, 150 nm, 120 nm, 100 nm, 80 nm, 60 nm, 55 nm, 50 nm, 45 nm, 40 nm, 30 nm or 20 nm, and the lower limit may be 1 nm, 2 nm, 5 nm, 8 nm, 10 nm, 12 nm, 15 nm or 18 nm.

The range of the thickness $D_3$ of the protective layer 103 can be formed by a combination of any of the foregoing upper limit and any lower limit, or can be formed by a combination of the foregoing any upper limit and any other upper limit, or can be formed by a combination of the foregoing any lower limit and any other lower limit value.

More preferably, the thickness $D_3$ of the protective layer 103 is 5 nm≤$D_3$≤200 nm, more preferably, is 10 nm≤$D_3$≤200 nm.

Further when the protective layers 103 are disposed on the two surfaces of the copper-based conductive layer 102, the thickness $D_a$ of the upper protective layer is 1 nm≤$D_a$≤200 nm and $D_a$≤0.1$D_1$; and the thickness $D_b$ of the lower protective layer is 1 nm≤$D_b$≤200 nm and $D_b$≤0.1D1. It is preferred that $D_a$>$D_b$, which enables the upper protective layer and the lower protective layer to protect the copper-based conductive layer 102 cooperatively from chemical corrosion and mechanical damage, and enables the electrochemical device to have relatively high energy density. More preferably, 0.5 $D_a$≤$D_b$≤0.8 $D_a$. Thus, the cooperative protection effect of the upper protective layer and the lower protective layer can be better exerted.

In the embodiments of the present application, the negative electrode current collector 10 has an elongation at break of greater than or equal to 3%. The negative electrode current collector 10 having an elongation at break of greater than or equal to 3% has high fracture toughness, which greatly reduces the probability of its fracture and the presence of cracks in the copper-based conductive layer 102 during processing and use, thereby improving yields of the negative electrode current collector 10 and the negative electrode plate 20 and electrochemical device using the same during preparation and their safety and reliability during use.

The elongation at break may be tested by the method known in the art. As an example, the negative electrode current collector 10 is cut into a sample of 15 mm×200 mm, a tensile test is performed by Go-tech tensile tester at normal temperature and pressure (25° C., 0.1 MPa), an initial position is set such that the sample between the clamps is 50 mm long, the sample is stretched at a speed of 5 mm/min, the clamp displacement y (mm) at tensile break is recorded, and finally the elongation at break is calculated as (y/50)×100%.

In the embodiments of the present application, the copper-based conductive layer 102 is formed on the organic support layer 101, for example, by at least one means of mechanical rolling, bonding, vapor deposition, chemical plating, and electroplating. Among them, vapor deposition and electroplating are preferred. That is, the copper-based conductive layer 102 is preferably a vapor deposition layer or an electroplating layer, which enables the copper-based crystal grain size in the copper-based conductive layer to be in the range of 10 nm to 500 nm, enables the bonding force between the copper-based conductive layer 102 and the organic support layer 101 to be relatively high, and improves the mechanical properties and electrical conductivity performance of the negative electrode current collector 10.

The above-mentioned vapor deposition is preferably physical vapor deposition. The physical vapor deposition is preferably at least one of evaporation and sputtering, wherein the evaporation is preferably at least one of vacuum evaporation, thermal evaporation and electron beam evaporation, and the sputtering is preferably magnetron sputtering.

As an example, the copper-based conductive layer 102 can be formed by vacuum evaporation including the steps of placing the organic support layer 101 after surface cleaning treatment in a vacuum evaporation chamber, melting and evaporating a metal wire in the metal evaporation chamber at a high temperature of from 1300° C. to 2000° C., and passing the evaporated metal through a cooling system in the vacuum evaporation chamber and then depositing the evaporated metal on the organic support layer 101 to form the copper-based conductive layer 102.

When the protective layer 103 is present, it can be formed on the copper-based conductive layer 102 by at least one of vapor deposition, in-situ formation and coating. The vapor deposition may be the aforementioned vapor deposition. The in-situ formation is preferably in-situ passivation, that is, a method of forming a metal oxide passivation layer in situ on a metal surface. The coating is preferably at least one of roll coating, extrusion coating, knife coating, and gravure coating.

Preferably, the protective layer 103 is formed on the copper-based conductive layer 102 by at least one means of vapor deposition and in-situ formation, which enables relatively high bonding force between the copper-based conductive layer 102 and the protective layer 103, thereby better protecting the negative electrode current collector 10 by the protective layer 102 and ensuring good working performance of the negative electrode current collector 10.

When the protective layer 103 (that is, the lower protective layer) is disposed between the copper-based conductive layer 102 and the organic support layer 101, the lower protective layer may be formed on the organic support layer 101 first, and then the copper-based conductive layer 102 is formed on the lower protective layer. The lower protective layer may be formed on the organic support layer 101 by at least one means of vapor deposition and coating, and preferably by vapor deposition. The copper-based conductive layer 102 may be formed on the lower protective layer by at least one means of mechanical rolling, bonding, vapor deposition and chemical plating, and preferably by vapor deposition.

Negative Electrode Plate

In the second aspect, the embodiments of the present application provide a negative electrode plate 30. FIG. 6 is a schematic structural diagram of a negative electrode plate 30 according to an embodiment of the present application. Referring to FIG. 6, the negative electrode plate 30 includes a negative electrode current collector 10 and an active material layer 20 that are laminated, wherein the negative electrode current collector 10 is the negative electrode current collector according to the first aspect of the present application.

Since the negative electrode plate 30 of the embodiments of the present application adopts the negative electrode current collector 10 according to the first aspect of the embodiments of the present application, it has relatively high mechanics, relatively high preparation yield, relatively high use safety and reliability, low weight and relatively high electrochemical performance.

As an example, referring to FIG. 6, the negative electrode plate 30 includes a negative electrode current collector 10 and active material layers 20 that are laminated, the negative electrode current collector 10 has two opposite surfaces in its thickness direction, and the active material layer 20 is laminated on the two surfaces of the negative electrode current collector 10.

It can be understood that the active material layer 20 may also be laminated on either of the two surfaces of the negative electrode current collector 10.

In the negative electrode plate 30 of the embodiments of the present application, the negative electrode active material layer 20 may adopt any negative electrode active material in the art, which is not limited in this application.

For example, the negative electrode active material for lithium-ion secondary batteries may be one or more of metallic lithium, natural graphite, artificial graphite, mesocarbon microbeads (MCMB), hard carbon, soft carbon, silicon, silicon-carbon negative electrode, SiO, Li—Sn alloy, Li—Sn—O alloy, Sn, SnO, $SnO_2$, lithium titanate of a spinel structure, and Li—Al alloy.

Optionally, the negative active material layer 20 may further include a conductive agent. This application does not limit the type of the conductive agent. As an example, the conductive agent is one or more of graphite, superconducting carbon, acetylene black, carbon black, Ketjen black, carbon dots, carbon nanotubes, graphene, and carbon nanofibers.

Optionally, the negative electrode active material layer 20 may further include a binder. This application does not limit the type of the binder. As an example, the binder is one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

The negative electrode plate 30 can be prepared according to a conventional method in the art. Generally, the negative electrode active material and optional conductive agent and binder are dispersed in a solvent which may be NMP or deionized water to form a uniform negative electrode slurry; the negative electrode slurry is applied to the negative electrode current collector 10, and the negative electrode plate 30 is obtained after steps including drying and the like.

Electrochemical Device

In the third aspect, the embodiments of the present application provide an electrochemical device. The electrochemical device includes a positive electrode plate, a negative electrode plate and an electrolyte, wherein the negative electrode plate is the negative electrode plate according to the second aspect of the present application.

The aforementioned electrochemical device may be, but not limited to, a lithium-ion secondary battery, a lithium primary battery, a sodium ion battery, a magnesium ion battery, etc.

The electrochemical device adopts the negative electrode plate provided according to the second aspect of the embodiments of the present application, and thus the electrochemical device of the embodiments of the present application has relatively high comprehensive electrochemical performance, including relatively high energy density, rate performance, cycle performance and safety performance.

The above positive electrode plate may comprises a positive electrode current collector and a positive electrode active material layer.

The positive electrode current collector may adopt one or more of aluminum, aluminum alloy, copper, copper alloy, nickel, nickel alloy, titanium, titanium alloy, silver and silver alloy.

The positive electrode active material layer may adopt any positive electrode active material in the art, which is not limited in the present application.

For example, the positive electrode active material for lithium-ion secondary batteries may be one or more of lithium transition metal composite oxides, and composite oxides obtained by adding other transition metals or non-transition metals or non-metals to lithium transition metal composite oxides. The transition metals may be one or more of Mn, Fe, Ni, Co, Cr, Ti, Zn, V, Al, Zr, Ce, and Mg.

As an example, the positive electrode active material may be selected from one or more of lithium cobalt oxide, lithium nickel oxide, lithium manganese oxide, lithium nickel manganese oxide, lithium nickel cobalt manganese oxide, lithium nickel cobalt aluminum oxide, and lithium-containing phosphate of an olivine structure. For example, the lithium transition metal composite oxides are one or more of $LiMn_2O_4$, $LiNiO_2$, $LiCoO_2$, $LiNi_{1-y}Co_yO_2$ ($0<y<1$), $LiNi_a$ $Co_bAl_{1-a-b}O_2$ ($0<a<1$, $0<b<1$, $0<a+b<1$), $LiMn_{1-m-n}$ $NimCo_nO_2$ ($0<m<1$, $0<n<1$, $0<m+n<1$), $LiMPO_4$ (M may be one or more of Fe, Mn, and Co), and $Li_3V_2(PO_4)_3$.

Optionally, the positive electrode active material layer may further include a binder. This application does not limit the type of the binder. As an example, the binder is one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

Optionally, the positive electrode active material layer may further include a conductive agent. This application does not limit the type of the conductive agent. As an example, the conductive agent is one or more of graphite, superconducting carbon, acetylene black, carbon black, Ketjen black, carbon dots, carbon nanotubes, graphene, and carbon nanofibers.

The positive electrode plate can be prepared according to a conventional method in the art. Generally, the positive electrode active material and optional conductive agent and binder are dispersed in a solvent which for example is N-methyl pyrrolidone, abbreviated as NMP to form a uniform positive electrode slurry; the positive electrode slurry is applied to the positive current collector, and the positive electrode plate is obtained after steps including drying and the like.

In the electrochemical device of the embodiments of the present application, the electrolyte may be a solid electrolyte or a non-aqueous electrolytic solution, such as those obtained by dispersing an electrolyte salt in an organic solvent.

In the aforementioned electrolyte, the organic solvent serves as a medium to transport ions in electrochemical reaction, and may adopt any organic solvent in the art. As a source of ions, the electrolyte salt may be any electrolyte salt in the art.

For example, the organic solvent for lithium-ion secondary batteries may be one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

For example, the electrolyte salt for lithium-ion secondary batteries may be one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

The electrolyte may further optionally include additives. The type of additives is not specifically limited, and may be selected according to requirements. As an example, the additives may include one or more of vinylene carbonate (VC), vinyl ethylene carbonate (VEC), fluoroethylene carbonate (FEC), succinonitrile (SN), adiponitrile (ADN), 1,3-propylene sultone (PST), tris(trimethylsilane) phosphate (TMSP), and tris(trimethylsilane) borate (TMSB).

When the electrochemical device adopts an electrolytic solution, a separator is required to be disposed between the positive electrode plate and the negative electrode plate for separation. The type of separator is not specially limited, and the separator may be any known porous separator with good chemical and mechanical stability, such as one or more of glass fiber, non-woven fabric, polyethylene, polypropylene, and polyvinylidene fluoride. The separator may be a single-layer film or a multi-layer composite film. When the separator is a multi-layer composite film, materials of respective layers may be the same or different.

The electrochemical device is prepared by the steps of stacking the positive electrode plate, the separator and the negative electrode plate in order so that the separator is disposed between the positive electrode plate and the negative electrode plate for isolation to obtain a battery core, which may be obtained by winding; placing the battery core into a package shell followed by injecting the electrolytic solution and sealing.

Examples

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Preparation Methods

Preparation of Negative Electrode Current Collector

A organic support layer with a predetermined thickness was selected and subjected to surface cleaning treatment, the organic support layer after the surface cleaning treatment was placed in a vacuum evaporation chamber, a high-purity copper wire in the metal evaporation chamber was melted and evaporated at a high temperature from 1300° C. to 2000° C., and the evaporated metal passed through a cooling system in the vacuum evaporation chamber and was finally deposited on two surfaces of the organic support layer to form a copper based conductive layer.

Preparation of Negative Electrode Plate

Negative electrode active materials including graphite, conductive carbon black, sodium carboxymethyl cellulose as a thickener, and styrene butadiene rubber emulsion (SBR) as a binder were mixed thoroughly at a weight ratio of 96.5:1.0:1.0:1.5 in an appropriate amount of deionized water to form a uniform negative electrode slurry; the negative electrode slurry was applied to a negative electrode current collector, and a negative electrode plate was obtained after steps including drying and the like.

Preparation of Positive Electrode Current Collector

An aluminum foil with a thickness of 12 μm was used.

Preparation of Conventional Positive Electrode Plate

Positive electrode active materials including $LiNi_{1/3}CO_{1/3}Mn_{1/3}O_2$ (NCM333), conductive carbon black, and polyvinylidene fluoride (PVDF) as a binder were mixed thoroughly at a weight ratio of 93:2:5 in an appropriate amount of N-methylpyrrolidone (NMP) solvent to form a uniform positive electrode slurry; the positive electrode slurry was applied to a positive electrode current collector, and a positive electrode plate was obtained after steps including drying and the like.

Preparation of Electrolytic Solution

Ethylene carbonate (EC) and ethyl methyl carbonate (EMC) at a volume ratio of 3:7 were mixed uniformly to obtain an organic solvent, and then 1 mol/L $LiPF_6$ was uniformly dissolved in the organic solvent.

Preparation of Lithium-Ion Secondary Battery

The positive electrode plate, the separator which was a PP/PE/PP negative electrode film, and the negative electrode plate were laminated in sequence and then wound into an electrode assembly, and the electrode assembly was packaged into a packaging housing, injected with the electrolyte and sealed to obtain a lithium-ion secondary battery.

Test Section

1. Test of the Negative Electrode Current Collector

1) Test of Copper-Based Crystal Grain Size d in the Copper-Based Conductive Layer The Bruker D8 Discover X-ray diffractometer from Bruker AxS, Germany, was used to determine the X-ray diffraction spectrum of the copper-based conductive layer, with CuKα rays as a radiation source, in which the ray wavelength $\lambda=1.54056$ Å, the scanning $2\theta$ angle range is from 20° to 80°, and the scanning rate is 0.05°/s. In accordance with the diffraction angle and half-height width of the diffraction peak at Cu (111) crystal plane in the X-ray diffraction spectrum, the copper-based crystal grain size d was calculated using the Scherrer formula.

2) Test of Young's Modulus of the Organic Support Layer

The organic support layer was cut into a 15 mm×200 mm sample, thickness h (μm) of the sample was measured with a ten-thousandth micrometer, a tensile test was performed with the Go-tech tensile tester at normal temperature and pressure (25° C., 0.1 MPa), an initial position was set such that the sample between the clamps was 50 mm long, the sample was stretched at a speed of 50 mm/min, the load L (N) of stretching to break and clamp displacement y (mm) were recorded, then stress $\varepsilon$ (GPa)=L/(15×h), strain $\eta1=y/50$, a stress-strain curve was drawn, and the curve of an initial linear region was selected, wherein the slope of this curve was the Young's modulus E.

3) Test of Elongation at Break of the Negative Electrode Current Collector

The negative electrode current collector was cut into a sample of 15 mm×200 mm, a tensile test was performed by Go-tech tensile tester at normal temperature and pressure (25° C., 0.1 MPa), an initial position was set such that the sample between the clamps was 50 mm long, the sample was stretched at a speed of 5 mm/min, the clamp displacement y (mm) at tensile break was recorded, and finally the elongation at break was calculated as (y/50)×100%.

2. Performance Test of the Battery

(1) Cycle Performance Test

At 45° C., the lithium-ion secondary battery was charged to 4.2 V at a constant current rate of 1C and then charged at a constant voltage until the current was ≤0.05C, and afterwards discharged at a constant current rate of 1C to 2.8 V. This was a charge-discharge cycle. The discharge capacity at this time was a discharge capacity of the first cycle. The lithium-ion secondary battery was subjected to 1000 charge-discharge cycles according to the above method, the discharge capacity of the 1000th cycle was recorded, and a capacity retention rate of the lithium-ion secondary battery for 1000 cycles at 1C/1C was calculated.

Capacity retention rate of lithium-ion secondary battery for 1000 cycles at 1C/1C (%)=the discharge capacity of the 1000th cycle/the discharge capacity of the first cycle×100%

(2) Rate Performance Test

At 25° C., the lithium-ion secondary battery was charged to 4.2 V at a constant current rate of 1C and then charged at a constant voltage until the current was ≤0.05C, and afterwards discharged at a constant current rate of 1C to 3.0 V, thereby obtaining 1C rate discharge capacity of the lithium-ion secondary battery.

At 25° C., the lithium-ion secondary battery was charged to 4.2 V at a constant current rate of 1C and then charged at a constant voltage until the current was ≤0.05C, and afterwards discharged at a constant current rate of 4C to 3.0 V, thereby obtaining 4C rate discharge capacity of the lithium-ion secondary battery.

4C rate capacity retention rate (%) of the lithium ion secondary battery=4C rate discharge capacity/1C rate discharge capacity×100%

Test Results

1. Effect of the Negative Electrode Current
Collector in Improving the Gravimetric Energy
Density of the Electrochemical Device

TABLE 1

| Number of negative electrode current collector | Organic support layer | | Copper-based conductive layer | | Thickness of negative electrode current collector (μm) | Weight percentage of negative electrode current collector (%) |
|---|---|---|---|---|---|---|
| | Material | $D_2$ (μm) | Material | $D_1$ (μm) | | |
| Negative electrode current collector 1 | PET | 5 | Cu | 0.03 | 5.06 | 7 |
| Negative electrode current collector 2 | PET | 5 | Cu | 0.3 | 5.6 | 16 |
| Negative electrode current collector 3 | PET | 5 | Cu | 0.5 | 6 | 21.6 |
| Negative electrode current collector 4 | PET | 5 | Cu | 0.6 | 6.2 | 24.1 |
| Negative electrode current collector 5 | PI | 2 | Cu | 0.8 | 3.6 | 23.8 |
| Negative electrode current collector 6 | PET | 8 | Cu | 1 | 10 | 39.6 |
| Negative electrode current collector 7 | PET | 6 | Cu | 1.5 | 9 | 48.5 |
| Negative electrode current collector 8 | PET | 4 | Cu | 1.2 | 6.4 | 37.3 |
| Negative electrode current collector 9 | PET | 10 | Cu | 0.2 | 10.4 | 23.3 |
| Negative electrode current collector 10 | PI | 8 | Cu | 2 | 12 | 65.3 |
| Negative electrode current collector 11 | PET | 5 | Cu | 3 | 11 | 57.2 |
| Conventional negative electrode current collector | / | / | Cu | 8 | 8 | 100 |

In Table 1, the weight percentage of the negative electrode current collector was a percentage of the weight of the negative electrode current collector per unit area relative to the weight of the conventional negative electrode current collector per unit area.

Compared with the traditional copper foil negative electrode current collector, the weight adopting the negative electrode current collector of the present application was reduced to various degrees, so that gravimetric energy densities of battery can be improved.

2. Effect of the Protective Layer on the Electrochemical Performance of the Negative Electrode Current Collector and the Electrochemical Device of the Present Application

TABLE 2

| Number of negative electrode current collector | Upper protective layer | | Lower protective layer | |
|---|---|---|---|---|
| | Material | $D_a$ (nm) | Material | $D_b$ (nm) |
| Negative electrode current collector 7-1 | / | / | Nickel | 1 |
| Negative electrode current collector 7-2 | / | / | Nickel | 10 |
| Negative electrode current collector 7-3 | / | / | Nickel based alloy | 50 |
| Negative electrode current collector 7-4 | / | / | Nickel | 150 |
| Negative electrode current collector 7-5 | Nickel | 5 | / | / |

TABLE 2-continued

| Number of negative electrode current collector | Upper protective layer | | Lower protective layer | |
|---|---|---|---|---|
| | Material | $D_a$ (nm) | Material | $D_b$ (nm) |
| Negative electrode current collector 7-6 | Nickel based alloy | 100 | / | / |
| Negative electrode current collector 7-7 | Nickel | 10 | Nickel | 5 |
| Negative electrode current collector 7-8 | Nickel | 10 | Nickel | 10 |
| Negative electrode current collector 7-9 | Nickel | 50 | Nickel | 50 |
| Negative electrode current collector 7-10 | Nickel | 100 | Nickel | 50 |
| Negative electrode current collector 7-11 | Nickel | 150 | Nickel | 75 |
| Negative electrode current collector 7-12 | Nickel oxide | 100 | Nickel oxide | 50 |
| Negative electrode current collector 7-13 | Nickel oxide | 100 | Nickel | 50 |
| Negative electrode current collector 7-14 | Two-layer protective layer in which the upper layer is nickel oxide layer of 25 nm and the lower layer is nickel layer of 25 nm | 50 | Nickel | 50 |

The negative electrode current collector in Table 2 was based on the negative electrode current collector 7 as shown in Table 1 and was provided with a protective layer.

The upper protective layer of the negative electrode current collector 7-14 adopted a two-layer protective layer that includes a nickel protective layer (i.e. a lower layer) on the surface of the Cu-based conductive layer facing away from the organic support layer, with a thickness of 25 nm; and a nickel oxide protective layer (i.e. an upper layer) on the surface of the nickel protective layer facing away from the organic support layer, with a thickness of 25 nm.

It can be seen from Table 4 that the cycle life and rate performance of the batteries using the negative electrode current collectors of the embodiments of the present application were good, and were equivalent to the cycle performance and rate performance of the batteries using the conventional negative electrode current collector. This showed that the negative electrode current collector of the embodiments of the present application would not have a significant adverse effect on the electrochemical perfor-

TABLE 3

| | Negative electrode plate | | |
| Number of battery | Number of negative electrode current | Number of negative electrode plate collector | Positive electrode plate |
|---|---|---|---|
| Battery 1 | Negative electrode plate 7 | Negative electrode current collector 7 | Conventional positive electrode plate |
| Battery 2 | Negative electrode plate 7-1 | Negative electrode current collector 7-1 | Conventional positive electrode plate |
| Battery 3 | Negative electrode plate 7-2 | Negative electrode current collector 7-2 | Conventional positive electrode plate |
| Battery 4 | Negative electrode plate 7-3 | Negative electrode current collector 7-3 | Conventional positive electrode plate |
| Battery 5 | Negative electrode plate 7-4 | Negative electrode current collector 7-4 | Conventional positive electrode plate |
| Battery 6 | Negative electrode plate 7-5 | Negative electrode current collector 7-5 | Conventional positive electrode plate |
| Battery 7 | Negative electrode plate 7-6 | Negative electrode current collector 7-6 | Conventional positive electrode plate |
| Battery 8 | Negative electrode plate 7-7 | Negative electrode current collector 7-7 | Conventional positive electrode plate |
| Battery 9 | Negative electrode plate 7-8 | Negative electrode current collector 7-8 | Conventional positive electrode plate |
| Battery 10 | Negative electrode plate 7-9 | Negative electrode current collector 7-9 | Conventional positive electrode plate |
| Battery 11 | Negative electrode plate 7-10 | Negative electrode current collector 7-10 | Conventional positive electrode plate |
| Battery 12 | Negative electrode plate 7-11 | Negative electrode current collector 7-11 | Conventional positive electrode plate |
| Battery 13 | Negative electrode plate 7-12 | Negative electrode current collector 7-12 | Conventional positive electrode plate |
| Battery 14 | Negative electrode plate 7-13 | Negative electrode current collector 7-13 | Conventional positive electrode plate |
| Battery 15 | Negative electrode plate 7-14 | Negative electrode current collector 7-14 | Conventional positive electrode plate |
| Battery 16 | Conventional negative electrode plate | Conventional negative electrode current collector | Conventional positive electrode plate |

TABLE 4

| Number of battery | Capacity retention rate at 45° C. for 1000 1C/1C cycles (%) | 4C rate capacity retention rate (%) |
|---|---|---|
| Battery 1 | 86.3 | 46.8 |
| Battery 2 | 86.3 | 46.5 |
| Battery 3 | 86.7 | 46.6 |
| Battery 4 | 86.5 | 46.0 |
| Battery 5 | 87.1 | 47.4 |
| Battery 6 | 86.5 | 46.4 |
| Battery 7 | 86.7 | 46.1 |
| Battery 8 | 87.2 | 47.3 |
| Battery 9 | 87.6 | 47.5 |
| Battery 10 | 87.8 | 47.7 |
| Battery 11 | 88.0 | 48.1 |
| Battery 12 | 88.3 | 48.6 |
| Battery 13 | 87.3 | 46.2 |
| Battery 14 | 86.9 | 48.3 |
| Battery 15 | 87.9 | 47.7 |
| Battery 16 | 86.7 | 47.9 | mance of the battery and negative electrode plate. Particularly, for the battery made of the negative electrode current collector provided with a protective layer, the capacity retention rate at 45° C. for 1000 1C/1C cycles and 4C rate capacity retention rate were further improved, indicating that the reliability of the battery was better.

3. Effect of Copper-Based Crystal Grain Size d of the Copper-Based Conductive Layer, and the Ratio of Thickness $D_1$ to Copper-Based Crystal Grain Size d on the Negative Electrode Current Collector By adjusting the deposition temperature, deposition rate, deposition time, etc. during the preparation of the copper-based conductive layer, copper-based conductive layers with different copper-based crystal grain sizes d and different thicknesses $D_1$ were obtained.

TABLE 5

| Number of negative electrode current collector | Organic support layer | | | Copper-based conductive layer | | | | Elongation at break |
|---|---|---|---|---|---|---|---|---|
| | Material | $D_2$ ( μm ) | E ( GPa ) | Material | $D_1$ ( μm ) | d ( nm ) | $D_1$/d | ( % ) |
| Control current collector 1 | PET | 5 | 4.1 | Cu | 3000 | 5 | 600 | 1.30 |
| Negative electrode current collector 12 | PET | 5 | 4.1 | Cu | 3000 | 10 | 300 | 3.40 |
| Negative electrode current collector 13 | PET | 5 | 4.1 | Cu | 1000 | 10 | 100 | 4.20 |
| Negative electrode current collector 14 | PET | 5 | 4.1 | Cu | 1000 | 20 | 50 | 4.70 |
| Negative electrode current collector 15 | PET | 5 | 4.1 | Cu | 1000 | 30 | 33.3 | 5.50 |
| Negative electrode current collector 16 | PET | 5 | 4.1 | Cu | 1000 | 50 | 20 | 6.40 |
| Negative electrode current collector 17 | PET | 5 | 4.1 | Cu | 1000 | 150 | 6.67 | 10.30 |
| Negative electrode current collector 18 | PET | 5 | 4.1 | Cu | 900 | 300 | 3 | 5.30 |
| Negative electrode current collector 19 | PET | 5 | 4.1 | Cu | 1000 | 500 | 2 | 4.40 |
| Negative electrode current collector 20 | PET | 5 | 4.1 | Cu | 500 | 500 | 1 | 3.20 |
| Negative electrode current collector 21 | PET | 5 | 4.1 | Copper alloy | 1000 | 50 | 20 | 6.90 |
| Negative electrode current collector 22 | PI | 15 | 4.3 | Cu | 1000 | 100 | 10 | 7.80 |
| Negative electrode current collector 23 | PEN | 6 | 6.3 | Cu | 1000 | 100 | 10 | 4.90 |
| Negative electrode current collector 24 | PSS | 5 | 7.1 | Cu | 1000 | 100 | 10 | 5.60 |

The composition of the copper alloy in Table 5 was: 95 wt % copper and 5 wt % nickel.

It can be seen from the results in Table 5 that when the copper-based crystal grain size d value of the copper-based conductive layer was too small, the mechanical properties of the negative electrode current collector were poor, the elongation at break was small, and it was easy to break, which caused poor yields of the negative electrode current collector and the negative electrode plate and electrochemical device using the same during preparation and caused poor safety and reliability during use of the negative electrode current collector and the negative electrode plate and electrochemical device. In addition, the $D_1$/d value also affected the mechanical properties of the negative electrode current collector.

Below are some exemplary embodiments of the present application.

Embodiment 1. A negative electrode current collector, comprising an organic support layer and an copper-based conductive layer disposed on at least one surface of the organic support layer, wherein a copper-based crystal grain size in the copper-based conductive layer is from 10 nm to 500 mm.

Embodiment 2. The negative electrode current collector according to Embodiment 1, wherein a thickness $D_1$ of the copper-based conductive layer and the copper-based crystal grain size d satisfies $1 \leq D_1/d \leq 300$, preferably $2 \leq D_1/d \leq 100$, more preferably $3 \leq D_1/d \leq 50$; and/or the copper-based crystal grain size in the copper-based conductive layer is from 30 nm to 300 nm, preferably from 50 nm to 150 nm.

Embodiment 3. The negative electrode current collector according to any one of Embodiments 1 to 2, wherein the organic support layer has a Young's modulus E of $E \geq 2$ GPa, and preferably 2 GPa$\leq$E$\leq$20 GPa.

Embodiment 4. The negative electrode current collector according to any one of Embodiments 1 to 3, wherein the negative electrode current collector has an elongation at break of 3% or more.

Embodiment 5. The negative electrode current collector according to any one of Embodiments 1 to 4, wherein the copper-based conductive layer has a thickness $D_1$ of 30 nm$\leq D_1 \leq$3 μm, preferably 300 nm$\leq D_1 \leq$2 μm, preferably 500 nm$\leq D_1 \leq$1.5 μm, and more preferably 600 nm$\leq D_1 \leq$1.2 μm; and/or, the organic support layer has a thickness $D_2$ of 1 μm$\leq D_2 \leq$30 μm, preferably 1 μm$\leq D_2 \leq$15 μm, preferably 1 μm$\leq D_2 \leq$10 μm, preferably 1 μm$\leq D_2 \leq$8 μm, preferably 2 μm$\leq D_2 \leq$8 μm, and more preferably 2 μm$\leq D_2 \leq$6 μm.

Embodiment 6. The negative electrode current collector according to any one of Embodiments 1 to 5, wherein the copper-based conductive layer comprises one or more of copper and copper alloy; and the copper alloy comprises copper element and additional elements, the additional elements are selected from titanium, vanadium, nickel, chromium, iron, cobalt, manganese, zinc, zirconium, molybdenum, niobium, tungsten, silver, palladium and cadmium, a mass percentage of the copper element in the copper alloy is 80 wt % or more, preferably, the copper-based conductive layer is a vapor deposited layer or an electroplated layer.

Embodiment 7. The negative electrode current collector according to any one of Embodiments 1 to 6, wherein the organic support layer comprises one or more of polymer materials and polymer based negative electrode materials;

the polymer materials are one or more of polyamide, polyimide, polyethylene terephthalate, polybutylene terephthalate, polyethylene naphthalate, polycarbonate, polyethylene, polypropylene, poly(propylene-co-ethylene), acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyoxymethylene, polyphenylene ether, polyphenylene sulfide, polyethylene glycol, polysulfur nitride, polyphenylene, polypyrrole, polyaniline, polythiophene, polypyridine, cellulose, starch, protein, epoxy resin, phenol resin, derivatives thereof, cross linkers thereof, and copolymers thereof; and the polymer-based negative electrode materials comprise the polymer material and an additive, and the additive comprises one or more of metallic materials and inorganic non-metallic materials.

Embodiment 8. The negative electrode current collector according to any one of Embodiments 1 to 7, further comprising a protective layer that is disposed on at least one of two opposite surfaces of the copper-based conductive layer in the thickness direction of the copper-based conductive layer;

the protective layer comprising one or more of metals, metal oxides and conductive carbon, and preferably comprising one or more of nickel, chromium, nickel-based alloy, copper-based alloy, alumina, cobalt oxide, chromium oxide, nickel oxide, graphite, superconducting carbon, acetylene black, carbon black, Ketjen black, carbon dots, carbon nanotubes, graphene, and carbon nanofibers; preferably the protective layer having a thickness $D_3$ of 1 nm$\leq D_3 \leq$200 nm, and the thickness $D_3$ of the protective layer and the thickness $D_1$ of the copper-based conductive layer satisfying: $D_3 \leq$0.1 $D_1$.

Embodiment 9. A negative electrode plate, comprising a negative electrode current collector and a negative electrode active material layer disposed on the negative electrode current collector, wherein the negative electrode current collector is the negative electrode current collector according to any one of Embodiments 1 to 8.

Embodiment 10. An electrochemical device, comprising a positive electrode plate, a negative electrode plate and an electrolyte, wherein the negative electrode plate is the negative electrode plate according to Embodiment 9.

Described above are merely specific embodiments of the present application, but the protection scope of the present application is not limited to thereto. Any modification, replacement, or other equivalent readily conceived by a skilled person in the art according to the disclosure of the present application shall fall within the protection scope of the present application. Therefore, the protection scope of the present application shall be subject to the protection scope of the claims.

What is claimed is:

1. A negative electrode current collector, comprising an organic support layer and a copper-based conductive layer disposed on at least one surface of the organic support layer, wherein the negative electrode current collector further comprises a protective layer that is disposed on a surface of the copper-based conductive layer facing away from the organic support layer; and wherein the protective layer comprises one or more of nickel, chromium, nickel-based alloy, copper-based alloy, alumina, cobalt oxide, chromium oxide, nickel oxide, graphite, superconducting carbon, acetylene black, carbon black, Ketjen black, carbon dots, carbon nanotubes, graphene, and carbon nanofibers, wherein the organic support layer comprises one or more of polymer materials and the polymer materials are one or more of polyimide, and polyethylene terephthalate, a thickness $D_1$ of the copper-based conductive layer and a copper-based crystal grain size d in the copper-based conductive layer satisfies 6.67$\leq D_1$/d$\leq$10, the copper-based conductive layer has a thickness $D_1$ of 600 nm$\leq D_1 \leq$1.2 μm; and the copper-based crystal grain size d in the copper-based conductive layer is from 100 nm to 150 nm.

2. The negative electrode current collector according to claim 1, wherein the organic support layer has a Young's modulus E of E$\geq$2 GPa.

3. The negative electrode current collector according to claim 1, wherein the negative electrode current collector has an elongation at break of 3% or more.

4. The negative electrode current collector according to claim 1, wherein the organic support layer has a thickness $D_2$ of 1 μm$\leq D_2 \leq$30 μm.

5. The negative electrode current collector according to claim 1, wherein the copper-based conductive layer comprises one or more of copper and copper alloy; and the copper alloy comprises copper element and additional elements, the additional elements are selected from titanium, vanadium, nickel, chromium, iron, cobalt, manganese, zinc, zirconium, molybdenum, niobium, tungsten, silver, palladium and cadmium, a mass percentage of the copper element in the copper alloy is 80 wt % or more.

6. The negative electrode current collector according to claim 1, further comprising a second protective layer that is disposed on a surface of the copper-based conductive layer facing toward the organic support layer.

7. A negative electrode plate, comprising a negative electrode current collector and a negative electrode active material layer disposed on the negative electrode current collector, wherein the negative electrode current collector is the negative electrode current collector according to claim 1.

8. An electrochemical device, comprising a positive electrode plate, a negative electrode plate and an electrolyte, wherein the negative electrode plate is the negative electrode plate according to claim 7.

9. The negative electrode current collector according to claim 2, wherein the organic support layer has the Young's modulus E of 2 GPa$\leq E \leq$20 GPa.

10. The negative electrode current collector according to claim 4, wherein the organic support layer has the thickness $D_2$ of 1 μm$\leq D_2 \leq$15 μm.

11. The negative electrode current collector according to claim 4, wherein the organic support layer has the thickness $D_2$ of 1 μm$\leq D_2 \leq$10 μm.

12. The negative electrode current collector according to claim 4, wherein the organic support layer has the thickness $D_2$ of 2 μm$\leq D_2 \leq$6 μm.

13. The negative electrode current collector according to claim 4, wherein the organic support layer has the thickness $D_2$ of 1 μm$\leq D_2 \leq$8 μm.

14. The negative electrode current collector according to claim 4, wherein the organic support layer has the thickness $D_2$ of 2 μm$\leq D_2 \leq$8 μm.

15. The negative electrode current collector according to claim 5, wherein the protective layer has a thickness $D_3$ of 1 nm$\leq D_3 \leq$200 nm, and the thickness $D_3$ of the protective layer and the thickness Di of the copper-based conductive layer satisfy: $D_3 \leq$0.1 $D_1$.

16. The negative electrode current collector according to claim 6, wherein the copper-based conductive layer is a vapor deposited layer or an electroplated layer.

\* \* \* \* \*